June 9, 1931.  H. R. KENNEDY  1,809,169
ADAPTABLE WHEEL HOLDER
Filed Nov. 5, 1930
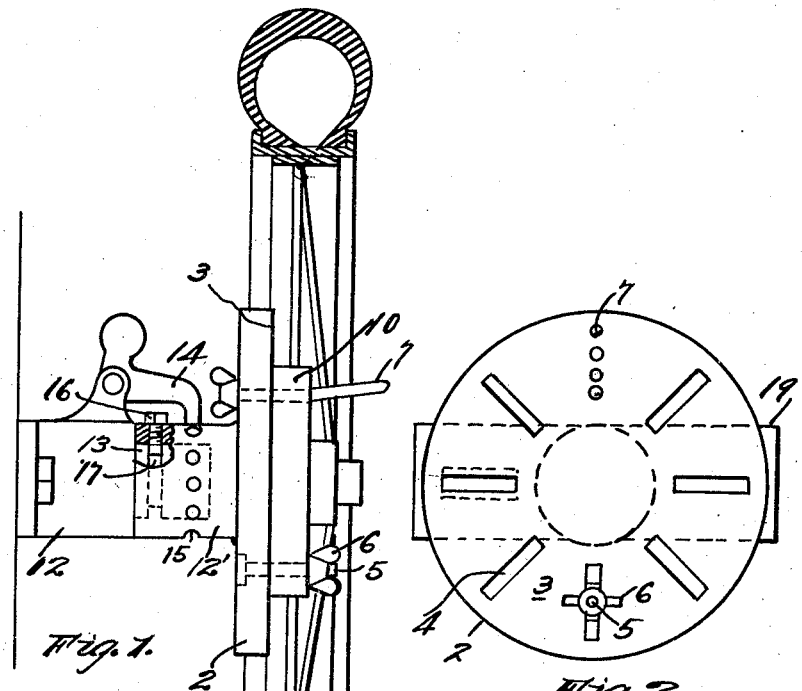
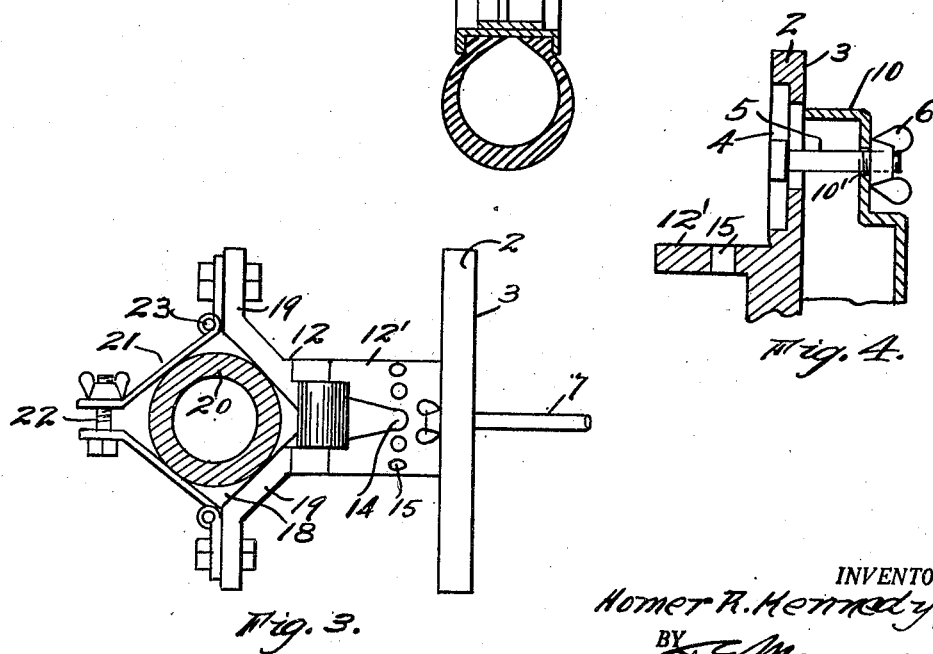
INVENTOR,
Homer R. Kennedy,
BY G. E. Maynard,
ATTORNEY.

Patented June 9, 1931

1,809,169

UNITED STATES PATENT OFFICE

HOMER R. KENNEDY, OF LOS ANGELES, CALIFORNIA

ADAPTABLE WHEEL HOLDER

Application filed November 5, 1930. Serial No. 493,583.

This invention pertains to garage and automotive service equipment and especially to means for hanging up wheels of vehicles so as to facilitate in many respects the mechanic's job on the given wheel.

An object is to provide a simple, practicable, low-cost, substantial and effective wheel hanger and holder adaptable to receive and firmly support a vehicle wheel which may need attention, adjustment, repair, alignment or other service.

Another object is to provide means which will enable all service to be made on a wheel while disposed in an upright position at a convenient height for and in front of the mechanic who may be sitting or standing, and by which the rough abuse to which the wheel is usually subject when thrown about on a concrete floor or metal topped bench or table may be wholly avoided.

A great advantage of the holder is that by its use the mechanic is relieved of much hard labor in handling a wheel needing service and his energy is therefore conserved and he is kept more efficient and fresh in effort. And, moreover, the work can be done on the wheel which will preferably be hung on this holder rather than while in place on a wheel axle of a vehicle in which case the mechanic would have to work in a stooping position.

The invention consists in certain advancements in this art as set forth in the ensuing disclosure and having, with the above, additional objects and advantages, and whose construction, combination and details of means, and the manner of operation will be made manifest in the description of the herewith illustrative embodiment; it being understood that modifications, variations and adaptations may be resorted to within the scope, principle and spirit of the invention as it is more directly claimed hereinafter.

Figure 1 is a side elevation of the holder as attached to a flat surface support, and with an applied wheel.

Figure 2 is a face view of the rest.

Figure 3 is a plan of the holder as attached to a stanchion or the like.

Figure 4 is a detail of a clamp bolt.

The preferred embodiment of the holder includes a plate or rest 2 of circular form with a flat front face 3 having a system of radial slots 4 undercut at the back for reception of heads of bolts 5 whose projecting ends have wing-nuts 6 which are tightened up against the hub box 10, of an applied wheel.

On the upper part of the rest 2 is a fixed horn or hook 7 onto which is hung the wheel box; this being provided in many types of wheels with a series of bolt holes 10' for assembly in a chassis gear.

As soon as the wheel is hung on the hook, then the bolts 5 are adjusted through the wheel hub holes and this is clamped up tight by the wing-nuts 6.

It is desirable to provide for the ready rotation of the wheel, in some cases, and this is accomplished by providing a back boss, mounting body comprising a base part 12 designed to be rigidly attached to a convenient support and which has a trunnion 13 on which is turnable a boss sleeve 12' forming a rigid part of the rest 2.

These boss parts are adapted to be solidly locked together as by means of a clutch pin 14 hinged on the base part 12 and engageable in pin holes 15, of which a series is provided around the sleeve 12'. This also has a key-pin 16, running in a groove 17 therefor in the trunnion, which holds the swivel parts in axial relation.

In order that the holder base may be mounted on various of convenient supports as a wall, a bench apron, a column, or a stanchion, a post, or a leg-part, the buttend of the base part 12 is somewhat bifurcated or crotched at 18 and its spread limbs 19 have flat butt faces to be set firmly against a plane surface as in Fig. 1, or the crotch may be straddled across a post 20, Fig. 3, and securely clamped by opposite strap irons 21 attached to the limbs 19 and whose near ends are clinched up by a bolt or bolts 22. The straps may have foot hinges 23 to permit ready adaptations to poles or posts of different shapes and sizes.

What is claimed is:

1. A wheel holder adaptable for holding various sizes and types of automotive vehicle wheels and which includes a flat faced rest provided with a rearward boss having a bracket base by which it may be butted against a convenient support and fastened; said rest having a radial row of holes from front to rear end a forwardly projecting hook securable in any of said holes to enter a bolt hole in the hub of the wheel to be hung on the rest and said rest having below the hook adjustable means to pass into a lock bolt hole of the hub and for clamping this to the face of the rest.

2. A wheel holder adaptable for holding various sizes and types of automotive vehicle wheels and which includes a flat faced rest provided with a rearward boss having a bracket base by which it may be butted against a convenient support and fastened; said rest having a bolt fixed therein and having forwardly projecting hook above its center to enter a bolt hole in the hub of the wheel to be hung on the rest and having below its center a system of adjustable bolts to pass through the hub and with nuts for clamping it to the rest the bolts being shiftable to register with wheel hub holes.

3. A wheel holder adaptable for holding various sizes and types of automotive vehicle wheels and which includes a flat faced rest provided with a rearward boss having a bracket base by which it may be butted against a convenient support and fastened; said rest having a means to hang the hub of the wheel on the rest and having means for clamping it to the rest; said base consisting of a stationary butt section and a part turnable thereon to rotate the rest to change position of the applied wheel without removing the same and an overbalance latch acting in one position to lock the turnable part and when thrown open to lie clear of and freeing the turnable part.

HOMER R. KENNEDY.